United States Patent
Fukushima et al.

(10) Patent No.: US 10,093,812 B2
(45) Date of Patent: *Oct. 9, 2018

(54) COMPOSITE MATERIAL OF RESIN—FLUORINE-CONTAINING BORIC ACID COMPOSITE PARTICLES

(71) Applicants: UNIMATEC CO., LTD., Tokyo (JP); HIROSAKI UNIVERSITY, Aomori (JP)

(72) Inventors: Takeshi Fukushima, Ibaraki (JP); Katsuyuki Sato, Ibaraki (JP); Hideo Sawada, Aomori (JP)

(73) Assignees: Unimatec Co., Ltd., Tokyo (JP); Hirosaki University, Aomori (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/125,036

(22) PCT Filed: Mar. 10, 2015

(86) PCT No.: PCT/JP2015/057023
§ 371 (c)(1),
(2) Date: Sep. 9, 2016

(87) PCT Pub. No.: WO2015/137344
PCT Pub. Date: Sep. 17, 2015

(65) Prior Publication Data
US 2017/0015840 A1     Jan. 19, 2017

(30) Foreign Application Priority Data

Mar. 11, 2014   (JP) .................................. 2014-047314

(51) Int. Cl.
| | |
|---|---|
| C09D 5/16 | (2006.01) |
| C08K 5/55 | (2006.01) |
| C08L 101/00 | (2006.01) |
| C09D 201/00 | (2006.01) |
| C09D 7/40 | (2018.01) |
| C03C 17/00 | (2006.01) |

(52) U.S. Cl.
CPC .......... C09D 5/1625 (2013.01); C03C 17/009 (2013.01); C08K 5/55 (2013.01); C08L 101/00 (2013.01); C09D 5/1668 (2013.01); C09D 5/1681 (2013.01); C09D 7/40 (2018.01); C09D 201/00 (2013.01); C03C 2217/76 (2013.01); C03C 2218/111 (2013.01)

(58) Field of Classification Search
CPC ...... C09D 7/12; C09D 201/00; C09D 5/1625; C09D 5/1668; C09D 5/1681; C08K 5/55; C08L 101/00; C03C 17/009; C03C 2217/76; C03C 2218/111
See application file for complete search history.

(56) References Cited

U.S. PATENT DOCUMENTS

| | | | |
|---|---|---|---|
| 3,574,770 A | 4/1971 | Paine | |
| 9,475,826 B2* | 10/2016 | Sato | ....................... C08G 77/18 |
| 2003/0212196 A1 | 11/2003 | Iwato et al. | |
| 2009/0036706 A1* | 2/2009 | Murata | ................. C07C 17/275 |
| | | | 560/227 |
| 2009/0143621 A1* | 6/2009 | Martin | .................... C07C 41/03 |
| | | | 564/96 |
| 2009/0171127 A1 | 7/2009 | Murata et al. | |
| 2016/0009739 A1* | 1/2016 | Sato | ....................... C07C 29/149 |
| | | | 556/470 |

FOREIGN PATENT DOCUMENTS

| | | |
|---|---|---|
| JP | 05-186719 | 7/1993 |
| JP | 2002-348567 | 12/2002 |
| JP | 2003-534439 A | 11/2003 |
| JP | 2004-285111 | 10/2004 |
| JP | 2008-038015 | 2/2008 |
| JP | 2011-505423 A | 2/2011 |
| JP | 4674604 | 2/2011 |
| JP | 2014-196482 | 10/2014 |
| WO | WO 2007/080949 A1 | 7/2007 |

OTHER PUBLICATIONS

International Preliminary Report on Patentability and Written Opinion from corresponding PCT application No. PCT/JP2015/057023 dated Sep. 22, 2016 (6 pgs).
International Search Report from corresponding PCT application No. PCT/JP2015/057023 dated Apr. 7, 2015 (4 pgs).

* cited by examiner

*Primary Examiner* — Blessing M Fubara
(74) *Attorney, Agent, or Firm* — Brinks Gilson & Lione

(57) ABSTRACT

A composite material of resin—fluorine-containing boric acid composite particles comprising a resin, and a condensate of boric acid and a fluorine-containing alcohol represented by the general formula $R_F$-A-OH (wherein $R_F$ is a perfluoroalkyl group having 6 or less carbon atoms, or a polyfluoroalkyl group, in which some of the fluorine atom or atoms of the perfluoroalkyl group are replaced by a hydrogen atom or hydrogen atoms, and which contains a terminal perfluoroalkyl group having 6 or less carbon atoms and a perfluoroalkylene group having 6 or less carbon atoms; and A is an alkylene group having 1 to 6 carbon atoms, or comprising a resin, and a condensate of boric acid, the said fluorine-containing alcohol and an alkoxysilane at a molar ratio of 1.0 or less based on the fluorine-containing alcohol. These composite materials of resin—fluorine-containing boric acid composite particles has good adhesion to inorganic substrates, and the like.

11 Claims, No Drawings

COMPOSITE MATERIAL OF RESIN—FLUORINE-CONTAINING BORIC ACID COMPOSITE PARTICLES

RELATED APPLICATION

This application is a 35 U.S.C. § 371 national phase filing of International Patent Application No. PCT/JP2015/057023, filed Mar. 10, 2015, which claims priority under 35 U.S.C. § 119 to Japanese Patent Application No. 2014-047314, filed Mar. 11, 2014, the entire disclosure of which is hereby expressly incorporated by reference.

TECHNICAL FIELD

The present invention relates to a composite material of resin–fluorine-containing boric acid composite particles. More particularly, the present invention relates to a composite material of resin—fluorine-containing boric acid composite particles, composite material, which has improved surface-treatment characteristics.

BACKGROUND ART

It is known that various surface characteristics are exhibited by coating inorganic material surfaces with various compounds or polymers. In particular, when a fluorine-based compound is used for surface treatment, surface modification can be applied for not only water-repellency, but also oil-repellency, due to properties of fluorine atoms. Thus, such fluorine-based compounds are used for coating on various substrates.

In particular, highly water- and oil-repellent coatings can be obtained by applying a surface-treating agent having a $C_8$-perfluoroalkyl group to substrates. However, it is recently reported that compounds containing a perfluoroalkyl group having 7 or more carbon atoms induce intracellular communication inhibition, which is considered to be a carcinogenic factor, in in-vitro tests using cell strains; that this inhibition depends on the length of the fluorinated carbon chain, rather than the functional groups; and that a longer carbon chain has higher inhibitory actively. The production of monomers using fluorinated long-carbon-chain compounds has been restricted.

Moreover, fluorine-containing alcohols containing a perfluoroalkyl group having 6 or less carbon atoms problematically have insufficient adhesion to inorganic substrates such as glass, metal, and stone.

Patent Documents 1 and 2 indicate that a fluorine-containing alcohol, an alkoxysilane (and a polymerizable functional group-containing alcohol) are subjected to a condensation reaction. However, the resulting alkoxysilane derivatives are used for the preparation of a curable composition to which a photoacid generator or photobase generator is added, or for the preparation of an inorganic conductive coating composition.

PRIOR ART DOCUMENTS

Patent Documents

Patent Document 1: JP-A-2004-285111
Patent Document 2: JP-A-5-186719
Patent Document 3: JP-B-4674604
Patent Document 4: WO 2007/080949 A1
Patent Document 5: JP-A-2008-38015
Patent Document 6: U.S. Pat. No. 3,574,770

OUTLINE OF THE INVENTION

Problem to be Solved by the Invention

An object of the present invention is to provide a composite material of resin—fluorine-containing boric acid composite particles, which does not produce perfluorooctanoic acid, and the like, even when released into the environment, which is formed using a fluorine-containing alcohol having units easily degradable to short-chain compounds, and which has adhesion to inorganic substrates, and the like.

Means for Solving the Problem

The present invention provides a composite material of resin—fluorine-containing boric acid composite particles comprising a resin, and a condensate of boric acid and a fluorine-containing alcohol represented by the general formula:

$$R_F\text{-A-OH} \qquad [\text{I}]$$

wherein $R_F$ is a perfluoroalkyl group having 6 or less carbon atoms, or a polyfluoroalkyl group, in which some of the fluorine atom or atoms of the perfluoroalkyl group are replaced by a hydrogen atom or hydrogen atoms, and which contains a terminal perfluoroalkyl group having 6 or less carbon atoms and a perfluoroalkylene group having 6 or less carbon atoms; and A is an alkylene group having 1 to 6 carbon atoms. The composite material of resin—fluorine-containing boric acid composite particles may be obtained by using a condensate of boric acid, the said fluorine-containing alcohol [I] and an alkoxysilane at a molar ratio of 1.0 or less based on the fluorine-containing alcohol.

Moreover, the present invention provides a composite material of resin—fluorine-containing boric acid composite particles composite material comprising a resin, and a condensate of boric acid and a fluorine-containing alcohol represented by the general formula:

$$R_F'\text{-A-OH} \qquad [\text{Ia}]$$

or the general formula:

$$\text{HO-A-}R_F''\text{-A-OH} \qquad [\text{Ib}]$$

wherein $R_F'$ is a linear or branched perfluoroalkyl group containing a terminal perfluoroalkyl group having 6 or less carbon atoms and a perfluoroalkylene group having 6 or less carbon atoms, and containing an O, S or N atom; $R_F''$ is a linear or branched perfluoroalkylene group containing a perfluoroalkylene group having 6 or less carbon atoms, and containing an O, S or N atom; and A is an alkylene group having 1 to 6 carbon atoms. The composite material of resin—fluorine-containing boric acid composite particles composite material may be obtained by using a condensate of boric acid, the said fluorine-containing alcohol [Ia] or [Ib] and an alkoxysilane at a molar ratio of 1.0 or less based on the fluorine-containing alcohol.

Effect of the Invention

In the fluorine-containing alcohols used in the present invention, the carbon number of the terminal perfluoroalkyl group or the perfluoroalkylene chain in a polyfluoroalkyl group is 6 or less, and units easily degradable to short-chain fluorine-containing compounds are contained. Therefore, the fluorine-containing alcohols do not lead to environmental pollution. Moreover, the resulting composite material of resin—fluorine-containing boric acid composite particles can form a thin film that exhibits excellent water- and oil-repellency and antifouling properties on a substrate surface. This thin film has a resin component, and thus also has excellent adhesion to inorganic substrates, and the like.

EMBODIMENTS FOR CARRYING OUT THE INVENTION

The fluorine-containing alcohol [I] is, for example, a polyfluoroalkyl alcohol represented by the general formula:

$$C_nF_{2n+1}(CH_2)_jOH \quad [II]$$

n: 1 to 6, preferably 4 to 6
j: 1 to 6, preferably 1 to 3, particularly preferably 2

The alkylene group A is, for example, a —CH$_2$— group, a —CH$_2$CH$_2$— group, or the like. Examples of the perfluoroalkylalkylalcohol having such an alkylene group include 2,2,2-trifluoroethanol (CF$_3$CH$_2$OH), 3,3,3-trifluoropropanol (CF$_3$CH$_2$CH$_2$OH), 2,2,3,3,3-pentafluoropropanol (CF$_3$CF$_2$CH$_2$OH), 3,3,4,4,4-pentafluorobutanol (CF$_3$CF$_2$CH$_2$CH$_2$OH), 2,2,3,3,4,4,5,5,5-nonafluoropentanol (CF$_3$CF$_2$CF$_2$CF$_2$CH$_2$OH), 3,3,4,4,5,5,6,6,6-nonafluorohexanol (CF$_3$CF$_2$CF$_2$CF$_2$CH$_2$CH$_2$OH), 3,3,4,4,5,5,6,6,7,7,8,8,8-tridecafluorooctanol (CF$_3$CF$_2$CF$_2$CF$_2$CF$_2$CF$_2$CH$_2$CH$_2$OH), and the like.

Moreover, a polyfluoroalkyl group refers to a group in which the terminal —CF$_3$ group of a perfluoroalkyl group is replaced by, for example, a —CF$_2$H group or a group in which the intermediate —CF$_2$— group is replaced by a —CFH— group or a —CH$_2$— group. Examples of the fluorine-containing alcohol [I] having such a substituent include 2,2,3,3-tetrafluoropropanol (HCF$_2$CF$_2$CH$_2$OH), 2,2,3,4,4,4-hexafluorobutanol (CF$_3$CHFCF$_2$CH$_2$OH), 2,2,3,3,4,4,5,5-octafluoropentanol (HCF$_2$CF$_2$CF$_2$CF$_2$CH$_2$OH), and the like.

The polyfluoroalkyl alcohol represented by the general formula [II] is described, for example, in Patent Document 3, and is synthesized through the following series of steps.

First, a polyfluoroalkyl iodide represented by the general formula:

$$C_nF_{2n+1}(CF_2CF_2)_b(CH_2CH_2)_cI$$

is reacted with N-methylformamide HCONH(CH$_3$) to form a mixture of polyfluoroalkyl alcohol and its formate. Then, the mixture is subjected to a hydrolysis reaction in the presence of an acid catalyst to form a polyfluoroalkyl alcohol of the formula:

$$C_nF_{2n+1}(CF_2CF_2)_b(CH_2CH_2)_cOH$$

However, the value of n+2b is 6 or less.
Examples of the polyfluoroalkyl iodide include the following:
CF$_3$(CH$_2$CH$_2$)I
CF$_3$(CH$_2$CH$_2$)$_2$I
C$_2$F$_5$(CH$_2$CH$_2$)I
C$_2$F$_5$(CH$_2$CH$_2$)$_2$I
C$_3$F$_7$(CH$_2$CH$_2$)I
C$_3$F$_7$(CH$_2$CH$_2$)$_2$I
C$_4$F$_9$(CH$_2$CH$_2$)I
C$_4$F$_9$(CH$_2$CH$_2$)$_2$I
C$_2$F$_5$(CF$_2$CF$_2$)(CH$_2$CH$_2$)I
C$_2$F$_5$(CF$_2$CF$_2$)(CH$_2$CH$_2$)$_2$I
C$_2$F$_5$(CF$_2$CF$_2$)$_2$(CH$_2$CH$_2$)I
C$_2$F$_5$(CF$_2$CF$_2$)$_2$(CH$_2$CH$_2$)$_2$I
C$_4$F$_9$(CF$_2$CF$_2$)(CH$_2$CH$_2$)I
C$_4$F$_9$(CF$_2$CF$_2$)(CH$_2$CH$_2$)$_2$I The fluorine-containing alcohol [I] may also be a fluorine-containing alcohol wherein the R$_F$ group is a polyfluoroalkyl group in which some of the fluorine atom or atoms of the perfluoroalkyl group are replaced by a hydrogen atom or hydrogen atoms, and which contains a terminal perfluoroalkyl group having 6 or less carbon atoms and a perfluoroalkylene group having 6 or less carbon atoms, specifically, a polyfluoroalkyl group having 3 to 20 carbon atoms, preferably 6 to 10 carbon atoms, and A is an alkylene group having 2 to 6 carbon atoms, preferably 2 carbon atoms. Examples thereof include polyfluoroalkyl alcohols represented by the general formula:

$$C_nF_{2n+1}(CH_2CF_2)_a(CF_2CF_2)_b(CH_2CH_2)_cOH \quad [III]$$

n: 1 to 6, preferably 2 to 4
a: 1 to 4, preferably 1
b: 0 to 2, preferably 1 or 2
c: 1 to 3, preferably 1

The polyfluoroalkyl alcohol represented by the general formula [III] is disclosed in Patent Document 3, and synthesized through the following series of steps.

First, a polyfluoroalkyl iodide represented by the general formula:

$$C_nF_{2n+1}(CH_2CF_2)_a(CF_2CF_2)_b(CH_2CH_2)_cI$$

is reacted with N-methylformamide HCONH(CH$_3$) to form a mixture of polyfluoroalkyl alcohol and its formate. The mixture is then subjected to a hydrolysis reaction in the presence of an acid catalyst to form a polyfluoroalkyl alcohol of the formula:

$$C_nF_{2n+1}(CH_2CF_2)_a(CF_2CF_2)_b(CH_2CH_2)_cOH$$

Examples of the polyfluoroalkyl iodide include the following:
CF$_3$(CH$_2$CF$_2$)(CH$_2$CH$_2$)I
C$_2$F$_5$(CH$_2$CF$_2$)(CH$_2$CH$_2$)I
C$_2$F$_5$(CH$_2$CF$_2$)(CH$_2$CH$_2$)$_2$I
C$_3$F$_7$(CH$_2$CF$_2$)(CH$_2$CH$_2$)I
C$_3$F$_7$(CH$_2$CF$_2$)(CH$_2$CH$_2$)$_2$I
C$_4$F$_9$(CH$_2$CF$_2$)(CH$_2$CH$_2$)I
C$_4$F$_9$(CH$_2$CF$_2$)(CH$_2$CH$_2$)$_2$I
C$_2$F$_5$(CH$_2$CF$_2$)(CF$_2$CF$_2$)(CH$_2$CH$_2$)I
C$_2$F$_5$(CH$_2$CF$_2$)(CF$_2$CF$_2$)(CH$_2$CH$_2$)$_2$I
C$_2$F$_5$(CH$_2$CF$_2$)$_2$(CF$_2$CF$_2$)(CH$_2$CH$_2$)I
C$_2$F$_5$(CH$_2$CF$_2$)$_2$(CF$_2$CF$_2$)(CH$_2$CH$_2$)$_2$I
C$_4$F$_9$(CH$_2$CF$_2$)(CF$_2$CF$_2$)(CH$_2$CH$_2$)I
C$_4$F$_9$(CH$_2$CF$_2$)$_2$(CF$_2$CF$_2$)(CH$_2$CH$_2$)I
C$_4$F$_9$(CH$_2$CF$_2$)$_2$(CF$_2$CF$_2$)(CH$_2$CH$_2$)$_2$I
C$_4$F$_9$(CH$_2$CF$_2$)$_2$(CF$_2$CF$_2$)(CH$_2$CH$_2$)$_2$I The fluorine-containing alcohol [Ia] is a fluorine-containing alcohol wherein the R$_F$' group is a linear or branched perfluoroalkyl group containing a terminal perfluoroalkyl group having 6 or less carbon atoms and a perfluoroalkylene group having 6 or less carbon atoms, and containing an O, S or N atom, specifically, a perfluoroalkyl group having 3 to 305 carbon atoms, preferably 8 to 35 carbon atoms, and containing O, S or N, and A is an alkylene group having 1 to 3 carbon atoms, preferably 1 carbon atom. Examples thereof include hexafluoropropene oxide oligomer alcohols represented by the general formula:

$$C_mF_{2m+1}O[CF(CF_3)CF_2O]_dCF(CF_3)(CH_2)_eOH \quad [IIa]$$

m: 1 to 3, preferably 1
d: 0 to 100, preferably 2 to 50
e: 1 to 6, preferably 2

Moreover, the fluorine-containing alcohol [Ib] may be a fluorine-containing alcohol wherein the $R_F''$ group contains a perfluoroalkylene group having 6 or less carbon atoms, specifically, a perfluoroalkylene group having 5 to 160 carbon atoms, and containing O, S or N, and A is an alkylene group having 1 to 3 carbon atoms, preferably 1 carbon atom. Examples thereof include perfluoroalkylene ether diols represented by the general formula:

$$HO(CH_2)_f CF(CF_3)[OCF_2CF(CF_3)]_g O(CF_2)_h O[CF(CF_3)CF_2O]_i CF(CF_3)(CH_2)_f OH \quad [IIb]$$

f: 1 to 3, preferably 1
g+i: 0 to 50, preferably 2 to 50
h: 1 to 6, preferably 2

Among the hexafluoropropene oxide oligomer alcohols represented by the general formula [IIa], a compound wherein m is 1 and e is 1 is described in Patent Document 4, and they are synthesized through the following step.

A fluorine-containing ether carboxylic acid alkyl ester represented by the general formula: $CF_3O[CF(CF_3)CF_2O]_n CF(CF_3)COOR$ (R: an alkyl group, n: an integer of 0 to 12) is subjected to a reduction reaction using a reducing agent such as sodium borohydride.

Moreover, among the perfluoroalkylene ether diols represented by the general formula [IIb], a compound wherein f=1 is disclosed in Patent Documents 5 and 6, and they are synthesized via the following series of steps:

$$FOCRfCOF \rightarrow H_3COOCRfCOOCH_3 \rightarrow HOCH_2RfCH_2OH$$

$$Rf: —CF(CF_3)[OCF_2C(CF_3)]_n O(CF_2)_c O[CF(CF_3)CF_2O]_b CF(CF_3)—$$

The alkoxysilane is represented by the general formula:

$$(R_1O)_p Si(OR_2)_q (R_3)_r \quad [IV]$$

$R_1$, $R_3$: H, $C_1$-$C_6$ alkyl group or aryl group
$R_2$: $C_1$-$C_6$ alkyl group or aryl group,
 with the proviso that not all of $R_1$, $R_2$ and $R_3$ are aryl groups
p+q+r: 4, with the proviso that q is not 0
and examples thereof include trimethoxysilane, triethoxysilane, trimethoxymethylsilane, triethoxymethylsilane, trimethoxyphenylsilane, triethoxyphenylsilane, tetramethoxysilane, tetraethoxysilane, and the like.

The proportion of these components is such that the boric acid is used at a ratio of about 0.1 to 50 parts by weight, preferably about 10 to 20 parts by weight, based on 100 parts by weight of fluorine-containing alcohol, and such that the alkoxysilane is used at a molar ratio of about 1.0 or less, preferably about 0.05 to 0.50, based on the amount of fluorine-containing alcohol. When the amount of boric acid used is less than this range, water- and oil-repellency decreases. In contrast, when the amount of boric acid used is greater than this range, dispersibility in a solvent decreases. Moreover, when the amount of alkoxysilane used is greater than this range, water- and oil-repellency decreases.

The amount of fluorine-containing alcohol in the obtained fluorine-containing boric acid composite particles is about 25 to 98 mol %, preferably about 40 to 80 mol %. The composite particle size (measured by a dynamic light scattering method) is about 10 to 600 nm, preferably about 15 to 350 nm.

In the fluorine-containing boric acid composite particles obtained as a reaction product, it is considered that the fluorine-containing alcohol is linked to a hydroxyl group of the boric acid particles. Therefore, the chemical and thermal stability of boric acid, and the excellent water- and oil-repellency, antifouling properties, and the like of fluorine are effectively exhibited. In fact, a glass surface treated with the fluorine-containing boric acid composite particles exhibits excellent water- and oil-repellency. Moreover, the particle size of the fluorine-containing boric acid composite particles, and the variation of the particle size show small values. The fluorine-containing boric acid composite particles are formed also as a reaction product of both of a fluorine-containing alcohol and alkoxysilane, and boric acid particles; however, other components are allowed to be mixed as long as the object of the present invention is not impaired.

The fluorine-containing boric acid composite particles are added to a resin to form a composite material. Examples of the resin include thermoplastic resins, such as polymethyl methacrylate, polyethylene, polypropylene, ABS resin, polyamide, polyester, polycarbonate, and polyphenylene sulfide; and thermosetting resins, such as epoxy resin, urethane resin, epoxy acrylate resin, polyimide resin, and unsaturated polyester resin.

The fluorine-containing alcohol, which is a composite component, has no polymer bonds, and thus has inferior durability to washing, etc., and inferior heat resistance. Although a composite of the fluorine-containing alcohol with boric acid has improved durability and heat resistance, its adhesion to inorganic substrates is not sufficient. However, a composite of the fluorine-containing boric acid composite particles with a resin has sufficiently improved adhesion to inorganic substrates.

The fluorine-containing boric acid composite particles may be added at any ratio. For example, in order to modify the resin component, about 1 wt. % of the composite particles based on the resin component can be effective. Moreover, various methods can be used to add the composite particles according to the addition ratio. The fluorine-containing boric acid composite particles can be not only added as one additive, but can also be coated with an organic solvent solution of resin. For example, the addition is performed in the following manner. After a tetrahydrofuran dispersion of a boric acid composite is prepared, a polymethyl methacrylate solution is added dropwise while stirring the dispersion, and tetrahydrofuran is finally added to adjust the concentration.

EXAMPLES

The following describes the present invention with reference to Examples.

Reference Example 1

1,100 mg (3.02 mmol) of $CF_3(CF_2)_5(CH_2)_2OH$ [FA-6], 200 mg of boric acid and 2 ml of tetrahydrofuran [THF] were charged in a 30-ml reaction vessel, and the mixture was stirred under room temperature condition for a day. Then, the solvent was distilled off, thereby obtaining 767 mg (yield: 59%) of the fluorine-containing boric acid composite particles. With respect to the obtained fluorine-containing boric acid composite particles, the following items were measured.

Particle Size and its Variation:

The particle size and its variation were measured using a methanol dispersion having a solid matters content of 1 g/L at 25° C. by a dynamic light scattering (DLS) method

Reference Examples 2 to 6

In Reference Example 1, the amount of FA-6 was changed appropriately, and tetraethoxysilane [TEOS; density: 0.94 g/cm$^3$] was also appropriately used.

Reference Examples 7 to 16

In Reference Example 1, various fluorine-containing alcohols were used in place of FA-6, and tetraethoxysilane was appropriately used. The amount of THF used in Reference Examples 11 to 13 was 4 ml.

OXF3PO: $HOCH_2CF(CF_3)OCF_2CF(CF_3)$
$OCF_2CF_2OCF(CF_3)CH_2OH$

OXF14PO: $HOCH_2CF(CF_3)[OCF_2CF(CF_3)]_n$
$OCF_2CF_2O[CF(CF_3)CF_2O]_mCF(CF_3)CH_2OH$ ($n+m=12$)

DTFAC: $C_4F_9(CH_2CF_2)(CF_2CF_2)_2(CH_2CH_2)OH$

TABLE 1

| Ref. Example | Fluorine-containing alcohol Abbreviation | mg | mM | Boric acid (mg) | TEOS ml | TEOS mM | Amount (mg) | Yield (%) | Particle size (nm) |
|---|---|---|---|---|---|---|---|---|---|
| 1 | FA-6 | 1100 | 3.02 | 200 | — | — | 767 | 59 | 130.0 ± 15.0 |
| 2 | FA-6 | 1100 | 3.02 | 100 | — | — | 900 | 75 | 196.0 ± 26.0 |
| 3 | FA-6 | 1100 | 3.02 | 50 | — | — | 656 | 57 | 33.9 ± 5.9 |
| 4 | FA-6 | 1100 | 3.02 | 200 | 0.10 | 0.45 | 1129 | 81 | 54.7 ± 5.0 |
| 5 | FA-6 | 1100 | 3.02 | 100 | 0.10 | 0.45 | 1035 | 80 | 72.1 ± 17.2 |
| 6 | FA-6 | 1100 | 3.02 | 50 | 0.10 | 0.45 | 908 | 73 | 24.3 ± 2.4 |
| 7 | OXF3PO | 1250 | 2.23 | 60 | — | — | 1061 | 81 | 313.0 ± 46.0 |
| 8 | OXF3PO | 1250 | 2.23 | 30 | — | — | 1152 | 90 | 288.0 ± 78.0 |
| 9 | OXF3PO | 1250 | 2.23 | 60 | 0.10 | 0.45 | 1166 | 89 | 65.7 ± 8.9 |
| 10 | OXF3PO | 5600 | 10.0 | 30 | 0.05 | 0.23 | 1011 | 79 | 266.0 ± 30.0 |
| 11 | OXF14PO | 1000 | 0.39 | 6.5 | — | — | 393 | 39 | 128.0 ± 14.0 |
| 12 | OXF14PO | 1000 | 0.39 | 13 | — | — | 365 | 36 | 262.0 ± 59.0 |
| 13 | OXF14PO | 1000 | 0.39 | 26 | — | — | 349 | 34 | 15.7 ± 1.0 |
| 14 | DTFAC | 100 | 0.19 | 12 | — | — | 108 | 96 | 105.0 ± 25.0 |
| 15 | DTFAC | 100 | 0.19 | 5.9 | — | — | 103 | 97 | 10.8 ± 1.1 |
| 16 | DTFAC | 100 | 0.19 | 2.9 | — | — | 99 | 96 | 313.0 ± 78.0 |

Examples 1 to 8

The fluorine-containing boric acid composite particles (10 mg) obtained in the above Reference Examples were each redispersed in 20 ml of tetrahydrofuran, and 990 mg of polymethyl methacrylate was then added thereto to prepare a polymer composite solution. The solution was coated on a glass substrate to obtain a composite material of resin—fluorine-containing boric acid composite particles, composite material. The surface properties of the composite material were analyzed.

Contact angle of droplets (unit: °):

4 µl of droplets of n-dodecane or water were gently brought into contact with thin layer surfaces of the obtained a composite material of resin—fluorine-containing boric acid composite particles, and the contact angle of the droplets adhering to the thin layer surfaces was measured by the θ/2 method using a contact angle meter (Drop Master 300, produced by Kyowa Interface Science Co., Ltd.). The contact angle with water was measured with time.

TABLE 2

| Example | Reference Example | n-dodecane | Water (elapsed time: min.) 0 | 5 | 10 | 15 | 20 | 25 | 30 |
|---|---|---|---|---|---|---|---|---|---|
| 1 | 3 | 42 | 100 | 93 | 91 | 92 | 86 | 82 | 77 |
| 2 | 6 | 38 | 82 | 78 | 78 | 81 | 78 | 80 | 78 |
| 3 | 7 | 18 | 76 | 72 | 73 | 72 | 74 | 73 | 77 |
| 4 | 9 | 27 | 92 | 81 | 81 | 76 | 75 | 74 | 72 |
| 5 | 11 | 53 | 89 | 77 | 83 | 75 | 78 | 75 | 74 |
| 6 | 14 | 41 | 77 | 73 | 70 | 66 | 65 | 62 | 62 |
| 7 | 15 | 38 | 74 | 67 | 63 | 59 | 59 | 56 | 55 |
| 8 | 16 | 40 | 71 | 66 | 60 | 60 | 57 | 56 | 53 |

The above results show that water- and oil-repellency was improved in all cases, except for the elapsed-time of 20 to 30 minutes for water.

Comparative Example 1

With respect to an uncoated glass substrate, the surface properties were analyzed in the same manner as in Example 1.

Comparative Example 2

With respect to a glass substrate coated with boric acid, the surface properties were analyzed in the same manner as in Example 1.

Comparative Example 3

With respect to a glass substrate coated with polymethyl methacrylate, the surface properties were analyzed in the same manner as in Example 1.

Comparative Examples 4 to 8

In Example 1, the same amount (10 mg) of each of the following samples was used in place of the fluorine-containing boric acid composite particles, and 990 mg of polymethyl methacrylate was added thereto to prepare a solution, which was then coated on a glass substrate. The surface properties of the glass substrate were analyzed in the same manner as in Example 1.

Comparative Example 4 boric acid/TEOS

Comparative Example 5

FA-6

Comparative Example 6

FA-6/TEOS

Comparative Example 7

OXF3PO

Comparative Example 8

OXF14PO

However, in Comparative Example 4, FA-6 was not used in Example 1, and 50 mg (0.81 mmol) of boric acid and 0.10 ml (0.45 mmol) of TEOS were used. The amount of the product was 130 mg, and the yield was 90%. Moreover, in Comparative Example 6, boric acid was not used in Example 1, and 1,100 mg (3.02 mmol) of FA-6 and 0.10 ml (0.45 mmol) of TEOS were used. The amount of the product was 763 mg, and the yield was 68%.

The results of the foregoing individual Comparative Examples are shown in the following Table 3.

TABLE 3

| Example | n-dodecane | Water (elapsed time: min.) | | | | | | |
|---|---|---|---|---|---|---|---|---|
| | | 0 | 5 | 10 | 15 | 20 | 25 | 30 |
| Com. Ex. 1 | 0 | 50 | — | — | — | — | — | — |
| Com. Ex. 2 | 22 | 60 | — | — | — | — | — | — |
| Com. Ex. 3 | 10 | 58 | — | — | — | — | — | — |
| Com. Ex. 4 | 20 | 55 | — | — | — | — | — | — |
| Com. Ex. 5 | 45 | 81 | 79 | 78 | 76 | 75 | 74 | 73 |
| Com. Ex. 6 | 11 | 36 | 32 | 28 | 21 | 17 | 13 | 7 |
| Com. Ex. 7 | 42 | 86 | 81 | 82 | 78 | 78 | 77 | 75 |
| Com. Ex. 8 | 58 | 102 | 81 | 79 | 77 | 76 | 71 | 70 |

The invention claimed is:

1. A composite material of resin—boric acid composite particles containing fluorine comprising:
a resin, and a condensate of boric acid and a fluorinated alcohol represented by the general formula:

$$R_F\text{-A-OH} \quad [\text{I}]$$

wherein $R_F$ is a perfluoroalkyl group having 6 or less carbon atoms, or a polyfluoroalkyl group, in which some of the fluorine atom or atoms of the perfluoroalkyl group are replaced by a hydrogen atom or hydrogen atoms, and which contains a terminal perfluoroalkyl group having 6 or less carbon atoms and a perfluoroalkylene group having 6 or less carbon atoms; and A is an alkylene group having 1 to 6 carbon atoms, or
comprising:
a resin, and a condensate of boric acid, the said fluorinated alcohol and an alkoxysilane at a molar ratio of 1.0 or less based on the fluorinated alcohol.

2. The composite material of resin—boric acid composite particles containing fluorine according to claim 1, wherein the fluorinated alcohol represented by the general formula [I] is a polyfluoroalkyl alcohol represented by the general formula:

$$C_nF_{2n+1}(CH_2)_j OH \quad [\text{II}]$$

wherein n is an integer of 1 to 6, and j is an integer of 1 to 6.

3. The composite material of resin—boric acid composite particles containing fluorine according to claim 1, wherein the fluorinated alcohol represented by the general formula [I] is a polyfluoroalkyl alcohol represented by the general formula:

$$C_nF_{2n+1}(CH_2CF_2)_a(CF_2CF_2)_b(CH_2CH_2)_c OH \quad [\text{III}]$$

wherein n is an integer of 1 to 6, a is an integer of 1 to 4, b is an integer of 0 to 2, and c is an integer of 1 to 3.

4. The composite material of resin—boric acid composite particles containing fluorine according to claim 1, wherein the alkoxysilane is a silane derivative represented by the general formula:

$$(R_1O)_p Si(OR_2)_q(R_3)_r \quad [\text{IV}]$$

wherein $R_1$ and $R_3$ are each a hydrogen atom, an alkyl group having 1 to 6 carbon atoms or an aryl group; $R_2$ is an alkyl group having 1 to 6 carbon atoms or an aryl group, with the proviso that not all of $R_1$, $R_2$ and $R_3$ are aryl groups; and p+q+r is 4, with the proviso that q is not 0.

5. The composite material of resin—boric acid composite particles containing fluorine according to claim 1, wherein the boric acid is used at a ratio of 0.1 to 50 parts by weight based on 100 parts by weight of the fluorinated alcohol.

6. A composite material of resin—boric acid composite particles containing fluorine according to claim 1 as an active ingredient.

7. A composite material of resin—boric acid composite particles containing fluorine comprising:
a resin, and a condensate of boric acid and a fluorinated alcohol represented by the general formula:

$$R_F'\text{-A-OH} \quad [\text{Ia}]$$

or the general formula:

$$\text{HO-A-}R_F''\text{-A-OH} \quad [\text{Ib}]$$

wherein $R_F'$ is a linear or branched perfluoroalkyl group containing a terminal perfluoroalkyl group having 6 or less carbon atoms and a perfluoroalkylene group having 6 or less carbon atoms, and containing an O, S or N atom; $R_F''$ is a linear or branched perfluoroalkylene group containing a perfluoroalkylene group having 6 or less carbon atoms, and containing an O, S or N atom; and A is an alkylene group having 1 to 6 carbon atoms, or
comprising:
a resin, and a condensate of boric acid, the said fluorinated alcohol and an alkoxysilane at a molar ratio of 1.0 or less based on the fluorinated alcohol.

8. The composite material of resin—boric acid composite particles containing fluorine according to claim 7, wherein the fluorinated alcohol represented by the general formula [Ib] is a perfluoroalkylene ether diol represented by the general formula:

$$\text{HO(CH}_2)_f\text{CF(CF}_3)[\text{OCF}_2\text{CF(CF}_3)]_g\text{O(CF}_2)_h\text{O[CF} \\ (\text{CF}_3)\text{CF}_2\text{O}]_i\text{CF(CF}_3)(\text{CH}_2)_f\text{OH} \quad [\text{IIb}]$$

wherein f is an integer of 1 to 3, g+i is an integer of 0 to 50, and h is an integer of 1 to 6.

9. The composite material of resin—boric acid composite particles containing fluorine according to claim 7, wherein the alkoxysilane is a silane derivative represented by the general formula:

   [IV]

wherein $R_1$ and $R_3$ are each a hydrogen atom, an alkyl group having 1 to 6 carbon atoms or an aryl group; $R_2$ is an alkyl group having 1 to 6 carbon atoms or an aryl group, with the proviso that not all of $R_1$, $R_2$ and $R_3$ are aryl groups; and p+q+r is 4, with the proviso that q is not 0.

10. The composite material of resin—boric acid composite particles containing fluorine according to claim 7, wherein the boric acid is used at a ratio of 0.1 to 50 parts by weight based on 100 parts by weight of the fluorinated alcohol.

11. A composite material of resin—boric acid composite particles containing fluorine according to claim 7 as an active ingredient.

* * * * *